(12) United States Patent
Gattami

(10) Patent No.: US 10,708,105 B2
(45) Date of Patent: Jul. 7, 2020

(54) FASTER-THAN-NYQUIST SIGNALING FOR FBMC BURST TRANSMISSIONS

(71) Applicant: Telefonaktiebolaget LM Ericsson (publ), Stockholm (SE)

(72) Inventor: Ather Gattami, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 47 days.

(21) Appl. No.: 16/085,831

(22) PCT Filed: Apr. 19, 2016

(86) PCT No.: PCT/SE2016/050335
§ 371 (c)(1),
(2) Date: Sep. 17, 2018

(87) PCT Pub. No.: WO2017/184035
PCT Pub. Date: Oct. 26, 2017

(65) Prior Publication Data
US 2019/0109743 A1  Apr. 11, 2019

(51) Int. Cl.
*H04L 27/26* (2006.01)
*H04L 25/03* (2006.01)
*H04L 25/497* (2006.01)
*H04L 5/00* (2006.01)

(52) U.S. Cl.
CPC ...... *H04L 27/264* (2013.01); *H04L 25/03343* (2013.01); *H04L 25/03834* (2013.01); *H04L 25/497* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 9,231,813 B1* | 1/2016 | von der Embse | H04L 27/3405 |
| 2011/0188550 A1* | 8/2011 | Wajcer | H04L 25/03343 |
| | | | 375/214 |
| 2014/0256336 A1* | 9/2014 | Manssour | H04L 1/0026 |
| | | | 455/450 |

(Continued)

FOREIGN PATENT DOCUMENTS

| | | |
|---|---|---|
| WO | 2015031075 A1 | 3/2015 |
| WO | 2015086136 A1 | 6/2015 |

OTHER PUBLICATIONS

International Search Report and Written Opinion dated Dec. 19, 2016 for International Application No. PCT/SE2016/050335 filed on Apr. 19, 2016, consisting of 10-pages.
Modenini, Andrea, et al.; "Faster-Than-Nyquist Signaling for Next Generation Communication Architectures"; University of Parma, Department of Information Engineering; Location and Date: Lisbon Portugal, Sep. 1-5, 2014, consisting of 5-pages.

(Continued)

*Primary Examiner* — Chi H Pham
*Assistant Examiner* — Vladislav Y Agureyev
(74) *Attorney, Agent, or Firm* — Sage Patent Group

(57) ABSTRACT

The present disclosure pertains to a method for operating a transmitting node in a wireless communication network. The method comprises transmitting a signal based on Filter Bank Multi-Carrier, FBMC, filtering, wherein the signal comprises signal carrying pulses, g(t), the pulses having a sampling interval T, the pulses being transmitted with a separation interval of $\rho T$, with $0 < \rho < 1$. The disclosure also pertains to related methods and devices.

13 Claims, 10 Drawing Sheets

(56) References Cited

U.S. PATENT DOCUMENTS

| | | | |
|---|---|---|---|
| 2015/0110216 A1* | 4/2015 | Bajcsy | H04B 1/40 375/285 |
| 2015/0304146 A1* | 10/2015 | Yang | H04L 5/0066 370/329 |
| 2015/0351098 A1* | 12/2015 | Schellmann | H04L 5/0064 370/329 |
| 2016/0204822 A1* | 7/2016 | Yu | H04B 1/7101 375/219 |
| 2016/0337105 A1* | 11/2016 | Lawton | H04L 1/0026 |
| 2017/0230087 A1* | 8/2017 | Sun | H04B 7/024 |
| 2017/0302408 A1* | 10/2017 | Dore | H04L 1/0668 |
| 2017/0331663 A1* | 11/2017 | Moradi | H04L 27/3494 |
| 2018/0049182 A1* | 2/2018 | Luo | H04L 27/2602 |
| 2018/0062808 A1* | 3/2018 | Lee | H04L 5/0048 |
| 2018/0109410 A1* | 4/2018 | Kim | H04L 7/041 |
| 2018/0367353 A1* | 12/2018 | Weitkemper | H04L 1/0668 |

OTHER PUBLICATIONS

Dasalukunte, Deepak, et al.; "Multicarrier Faster-Than-Nyquist Transceivers: Hardware Architecture and Performance Analysis"; IEEE Transactions on Circuits and Systems—I: Regular Papers, vol. 58, No. 4, Apr. 2011, consisting of 12-pages.

Murata, Hidekazu et al.; "R&D Activities for 5G in IEICE Technical Committee on Radio Communication Systems" Proceedings of APCC2015, IEICE 14 SB 0087, 2015, consisting of 7-pages.

Behrouz Farhang-Boroujeny; OFDM Versus Filter Bank Multicarrier—Development of Broadband Communication Systems—Digital Object Identifier 10.1109/MSP.2011.940267—Date of publication:Apr. 19, 2011—p. 92-112 consisting of 21-pages.

Ericsson Research; Emil Ringh et al.; "Faster-Than-Nyquist Signaling Revisited"—Consisting of 7-pages.

* cited by examiner

FASTER-THAN-NYQUIST SIGNALING FOR FBMC BURST TRANSMISSIONS

CROSS-REFERENCE TO RELATED APPLICATIONS

This application is a Submission Under 35 U.S.C. § 371 for U.S. National Stage Patent Application of International Application Number: PCT/SE2016/050335, filed Apr. 19, 2016 entitled "FASTER-THAN-NYQUIST SIGNALING FOR FBMC BURST TRANSMISSIONS," the entirety of which is incorporated herein by reference.

TECHNICAL FIELD

The present disclosure pertains to wireless communication technology, in particular cellular telecommunication, and especially Machine-Type Communication.

BACKGROUND

In modern telecommunication, e.g., LTE (Long-Term Evolution, a telecommunications standard), OFDM (Orthogonal Frequency-Division Multiplexing) is utilised as a scheme to encode data for downlink transmissions. However, OFDM may be less suitable than other technologies for upcoming new use cases, e.g. Machine-Type Communication (MTC, sometimes referred to a machine-to-machine communication, M2M), with a myriad of different possible demands on communication. A good candidate is FBMC (Filter Bank Multi-Carrier) transmission, which has more concentrate side-lobes than OFDM, and thus provides a more concentrated signal.

SUMMARY

It is an object of this disclosure to provide approaches allowing improved FBMC transmission.

Accordingly, there is disclosed a method for operating a transmitting node in a wireless communication network. The method comprises transmitting a signal based on Filter Bank Multi-Carrier, FBMC, filtering, wherein the signal comprises signal carrying pulses, g(t), the pulses having a sampling interval T, the pulses being transmitted with a separation interval of $\rho T$, with $0<\rho<1$.

There is also proposed a transmitting node for a wireless communication network. The transmitting node is adapted for transmitting a signal based on Filter Bank Multi-Carrier, FBMC, filtering, wherein the signal comprises signal carrying pulses, g(t), with a sampling interval T, the pulses being transmitted with a separation interval of $\rho T$, with $0<\rho<1$.

Moreover, a method for operating a receiving node in a wireless communication network is discussed. The method comprises decoding a received signal based on Filter Bank Multi-Carrier, FMBC, filtering, wherein the signal comprises signal carrying pulses, g(t), with a sampling interval T, and decoding is performed utilizing a separation interval of $\rho T$, with $0<\rho<1$.

A receiving node for a wireless communication network is also described. The receiving node is adapted for decoding a received signal based on Filter Bank Multi-Carrier, FMBC, filtering, wherein the signal comprises signal carrying pulses, g(t), with a sampling interval T, and decoding is performed utilizing a separation interval of $\rho T$, with $0<\rho<1$.

Furthermore, a program product comprising instructions is proposed. The instructions cause control circuitry to control and/or perform any one or any combination of the methods disclosed herein when executed by the control circuitry. The instructions may be executable by the control circuitry.

In addition, a storage medium storing a program product as described herein is described.

The disclosed approaches facilitate reducing delay and latency when using FMBC and/or to facilitate more efficient use of time resources when using FMBC. Accordingly, it is possible to use time frames defined for an OFDM system like LTE systems for FMBC transmissions, allowing introduction of FMBC into such system without requiring changes to pre-defined time structures.

BRIEF DESCRIPTION OF THE DRAWINGS

The drawings are provided to illustrate concepts and approaches of the disclosure and are not intended as limitation. The drawings comprise:

FIG. 7, showing an exemplary method for operating a transmitting node;

FIG. 8, showing another example of a transmitting node;

FIG. 9, showing an exemplary method for operating a receiving node; and

FIG. 10, showing another example of a receiving node.

DETAILED DESCRIPTION

Figure 1:
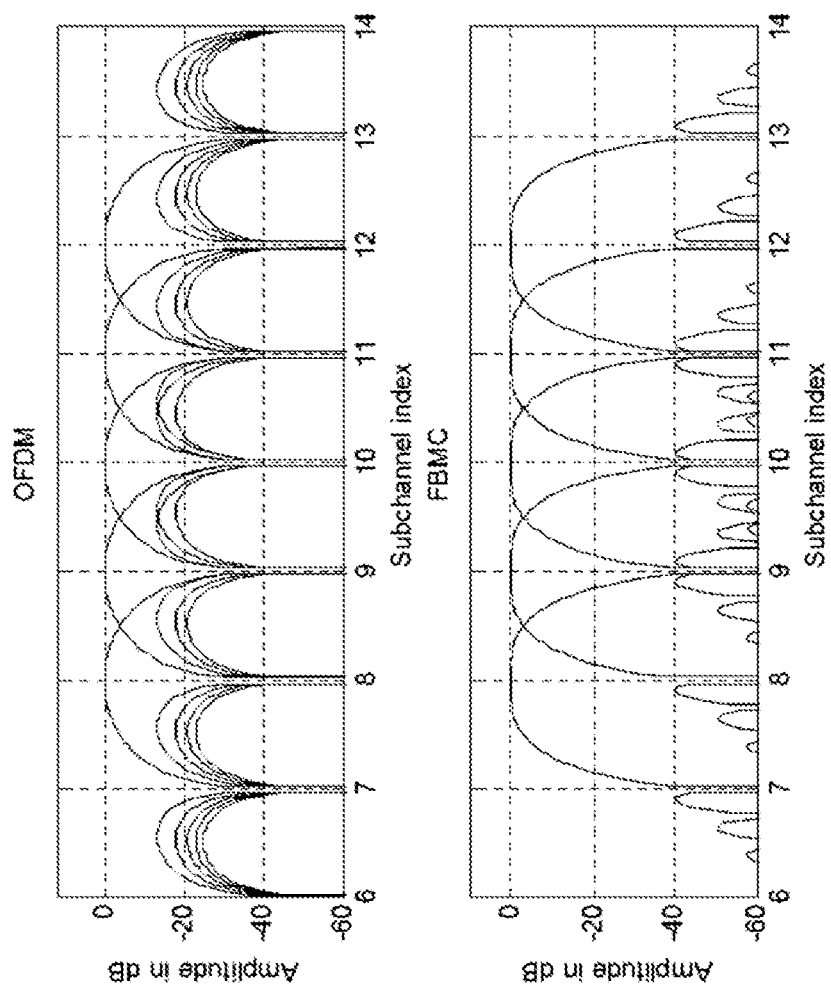
FIG. 1, showing a comparison of spectra of an OFDM and a FMBC process.

There is disclosed a method for operating a transmitting node in a wireless communication network. The method comprises transmitting a signal based on Filter Bank Multi-Carrier, FBMC, filtering. The signal comprises signal carrying pulses, g(t), the pulses having a sampling interval T, the pulses being transmitted with a separation interval of $\rho T$, with $0<\rho<1$.

Also, a transmitting node for a wireless communication network is disclosed. The transmitting node is adapted for transmitting a signal based on Filter Bank Multi-Carrier, FBMC, filtering, wherein the signal comprises signal carrying pulses, g(t), with a sampling interval T, the pulses being transmitted with a separation interval of $\rho T$, with $0<\rho<1$. Alternatively or additionally, there may be considered a transmitting node for a wireless communication network adapted for performing any of the methods for operating a transmitting node disclosed herein.

Transmitting may be based on precoding utilising a GTMH precoder.

It may be considered that transmitting is based on FBMC filtering being performed on precoded symbols. The precoded symbols may be precoded by a precoder, e.g. a Faster-Than-Nyquist (FTN) precoder and/or a GTMH precoder.

It may be considered that transmitting comprises filtering data symbols and/or symbols or bits based on data symbols (e.g., data symbols subjected to pre-processing), e.g. using the FBMC. Precoding may comprise determining arranging signal carrying pulses according to the separation interval.

Precoding may be performed before filtering and/or together with filtering, e.g. in a common step. The transmitting node may comprise a precoder for precoding, and/or a filter for filtering, in particular a FMBC-based filter. Transmitting may generally comprise sending, from an antenna or antenna arrangement, the signal and/or sending the signal via a wireless and/or radio and/or air interface. It may be considered that transmitting is performed in the downlink. In some cases, the technique used in the uplink may be different, due to different requirements for uplink transmissions (e.g., only one target). Generally, transmitting may comprise transmitting to one or more than one receiving nodes, which may be communicating with the radio access network the transmitting node is a part according to one variant.

A transmitting node may be any node or device adapted for transmitting signals, in particular as described herein. It may be considered that a transmitting node is a base station or network node. In another variant, a transmitting node may be a terminal.

There is also disclosed a method for operating a receiving node in a wireless communication network. The method comprises decoding a received signal based on Filter Bank Multi-Carrier, FMBC, filtering, wherein the signal comprises signal carrying pulses, g(t), with a sampling interval T, and decoding is performed utilizing a separation interval of $\rho T$, with $0<\rho<1$.

A receiving node for a wireless communication network may be considered. The receiving node may be adapted for decoding a received signal based on Filter Bank Multi-Carrier, FMBC, filtering, wherein the signal comprises signal carrying pulses, g(t), with a sampling interval T, and decoding is performed utilizing a separation interval of $\rho T$, with $0<\rho<1$. Alternatively or additionally, there may be considered a receiving node for a wireless communication network adapted for performing any of the methods for operating a receiving node disclosed herein.

Decoding may utilize a GTMH decoder and/or a FTN decoder.

Additionally or alternatively, decoding may comprise determining a maximum likelihood estimate of data symbols based on an added white noise function. The estimate may be performed based on the assumption that the white noise function provides a good estimate of the interference and/or noise the signal was subjected to before reception.

A receiving node may comprise a decoder for decoding. The decoder may comprise a filter. The filter may in particular a matched filter, which may be matched to a corresponding transmission filter, e.g. used for FMBC based transmission as described herein. It may be considered that the receiving node comprises an estimator for determining the maximum likelihood estimate and/or determining an estimate for received data symbols, e.g. based on a trellis method or similar. Decoding utilising a separation time may comprise utilising a decoder and/or filter set up to take into account that the pulses to be decoded/filtered are sent with the separation time instead of the sampling time defining their pulse spacing, e.g. by implementing a function depending on $\rho T$ and/or shifting and/or transforming a filtered result accordingly.

A receiving node may generally be any node adapted for receiving and/or decoding the signal. For example, a receiving node may be a terminal. Alternatively, in some variants, the receiving node may be a network node, e.g. a base station. A signal received may correspond to the signal transmitted, which has been undergoing changes during the transmission process.

A receiving node may be referred to as receiver, a transmitting node as transmitter. A receiving or transmitting node may comprise control circuitry, which may be adapted for control functionality, in particular for controlling and/or carrying out the respective method/s described herein. Control circuitry may generally comprise integrated circuitry, and/or one or more controller/s and/or microcontroller/s and/or processor/s and/or processor core/s and/or ASIC (Application Specific Integrated Circuitry) and/or FPGA/s (Field-Programmable Gate Array/s). Control circuitry may operably comprise and/or be connected or connectable to one or more memory devices, e.g. magnetic or optical memory, flash memory, buffer memory, cache memory, RAM (Random Access Memory), ROM (Read-Only Memory) and/or a storage medium as described herein. A storage medium may comprise any one or any combination of the memories as described herein, and/or may be readable by control circuitry, e.g. via a corresponding Input/Output interface. A transmitting node or receiving node (either or both of which may be referred to as node) may generally be a radio network node like a base station or relay node or micro node (or pico or femto or macro node), or a terminal. It may be considered that a node comprise radio circuitry, which may be adapted to provide transmitting and/or receiving and/or transceiving functionality, and/or filtering and/or amplifying and/or detection and/or measuring functionality. The control circuitry may be operably connected to control the radio circuitry. A node may comprise, and/or be connected or connectable to, antenna circuitry, which may comprise one or more antenna elements and/or antenna arrangements for wireless or radio transmission or reception.

A wireless communication network may in particular be a cellular network. The network may comprise a radio access network (RAN), which may be connected to a core network. A node as described herein may in particular be associated to and/or be part of a RAN, and/or be adapted to communicate (transmit to, and/or receive from) the RAN and/or a node of the RAN, if it is a terminal. A terminal may be considered to provide an endpoint for (radio/wireless) communication with the network.

An added white noise function may be any function providing a white noise model, in particular a Gaussian white noise function and/or a stationary function and/or a dynamic function.

A signal, in particular a transmitted signal, may comprise one or more symbols and/or may be extended over a sending time interval, e.g. over a burst or transmission time interval TTI, which may be pre-defined (e.g., according to a standard) and/or configured or determined by the transmitting node or the network (e.g., by another network node, e.g. a base station). A signal may comprise a number of signal carrying pulses larger than 1, which may be arranged in a time sequence having a pulse spacing, which may be represented by the separation time.

$\rho$ may be set to a value in the interval between 0.6 and 0.9, in particular between 0.75 and 0.85, or to or about 0.8. The value of $\rho$ may generally be dependent on the number of symbols to be transmitted and/or a pre-determined time interval, like a burst or TTI. It may in particular chosen such that the number of FBMC symbols covering the time interval is equal to the number of OFDM symbols covering the time interval utilising the sampling rate for transmission. $\rho$ May be pre-defined or configured, e.g. by a network node. In particular, a transmitting node like a base station may configure a terminal with the value. Configuring a node with a value may comprise control signaling informing the node about the value and/or instructing the node to utilise the value. Alternatively, a node may configure itself, e.g. by setting the value and/or tuning its circuitry accordingly, e.g. based on control signaling or reading the value from a memory.

Data symbols may be generally symbols (and/or bits) representing data to be transmitted. Precoding and/or filtering may be performed on the data symbols and/or be based on such symbols, e.g. with one or more steps of pre-processing (e.g., error encoding, padding, etc.).

A signal carrying pulse may generally be defined and/or determined by the FBMC filtering. The pulse may be defined by a correspondingly defined filter or function. A pulse may generally be considered to be with a sampling interval T if a sampling interval T is associated to it, in particular if it is determined with and/or for such a sampling interval. A signal carrying pulse may also be referred to as information carrying pulse, which may carry one or more bits of information to be transmitted and/or be based on the data symbols or bits. It may be considered that a signal carrying pulse is a Nyquist pulse and/or is dependent and/or represented by a filter function (pulse filter) or pulse function, which may be called g(t).

A sampling interval T may be considered a time interval, and may be associated to a sampling rate (1/T) for sampling a signal to be transmitted respectively a signal received. The sampling interval may in particular be a Nyquist interval and/or correspond to a Nyquist rate. The separation interval may be a time interval, which may be shorter than the sampling interval. The separation interval may be an interval of pulse transmission and/or an indicator of when pulses are to be transmitted or are transmitted. Generally, the separation time may define and/or represent a pulse spacing, the spacing (in time) between two pulses to be transmitted and/or used to defined the signal.

Generally, any of the modules (precoder, filter, decoder, etc.) mentioned herein may be implemented in firmware and/or software and/or hardware, e.g. in or on control circuitry and/or radio circuitry.

Filtering (and/or decoding) may be performed over a number K of subcarriers of a carrier, which may be larger than 1. A carrier may generally refer to a carrier frequency, and/or a frequency bandwidth around a central frequency and/or between a lower border frequency and a higher border frequency. The bandwidth may be divided into the number of subcarriers.

Filter Bank Multi-Carrier (FBMC) transmission is a technique that allows for transmitting signals with pre-specified spectrum. The transmitted signal is given by $$s(t) = \sum_{n=0}^{N-1}\sum_{k=0}^{K-1} a_k[n]g\left(t - \frac{nT}{2}\right)e^{j2\pi kFt}, \quad \text{(Eq. 1)}$$

wherein g(t) is the information carrying pulse (the Nyquist pulses), $a_k[n]$ are the data symbols, K is the number of subcarriers, and N is the number of pulses per transmitted FBMC symbol. In FBMC, the design of g(t) (representing a pulse filter) is emphasized. FIG. 1 shows the spectrum of g(t) for OFDM versus that of a designed FBMC filter. Transmitting may be based on such a method and/or a transmitting node may be adapted for this process, e.g. utilising a corresponding filter. A receiving node may utilise a matched filter (which may be based on a reversing filter reversing the transmitting filtering).

It can be seen that the side-lobes of OFDM are much more pronounced than the ones produced by FMBC with the exemplary filter g(t), which can make it more suitable in particular for MTC, e.g. in scenarios with a very large number of devices.

Moreover, there is described the Faster-than-Nyquist signaling (FTN) technique. This approach applies Nyquist pulses (with sampling rate 1/T), but instead of sending them time-separated by T seconds (sampling interval), they are send separated by a separation interval ρT seconds, wherein 0<ρ<1. Thus, the transmitted signal can be written as $$s(t)=\Sigma_k a_k \cdot \sqrt{\rho}g_T(t-k\rho T) \quad \text{(Eq. 2)},$$

wherein $\sqrt{\rho}g_T(t-n\rho T)$ is the new pulse shape, normalized such that is does not increase the power on the transmitter side end (the matched filter is corrected accordingly). The symbols $a_k$ are taken from some finite alphabet A. A Nyquist pulse may be a pulse determined utilizing the Nyquist frequency or sampling rate for sampling/digitising the signal (either in transmission or reception). A transmitting node may be adapted for utilising this technique and/or perform it. The node may comprise a corresponding FTN module, which may be implemented in a precoder. Decoding may be based on this technique.

Transmitting over an AWGN-channel (Additive White Gaussian Noise), a channel for which white Gaussian noise is added, this gives the received signal according to $$r(t)=s(t)+w(t) \quad \text{(Eq. 3)},$$

wherein w(t) is a stationary, white, Gaussian process as an example for an added white noise function). This approach may be used to model typical noise an actually transmitted signal may be subjected to. The transmitter side may be represented by a transmitter.

The signal is then sampled on the receiver side (represented by a receiver) using a matched filter to optimize the SNR (Signal-to-Noise Ratio) and get a sufficient set of data points for the estimation, according to $$y_n=\int_{-\infty}^{\infty} r(t)\cdot\sqrt{\rho}g_T(t-n\rho T)dt \quad \text{(Eq. 4)}.$$

Figure 2:
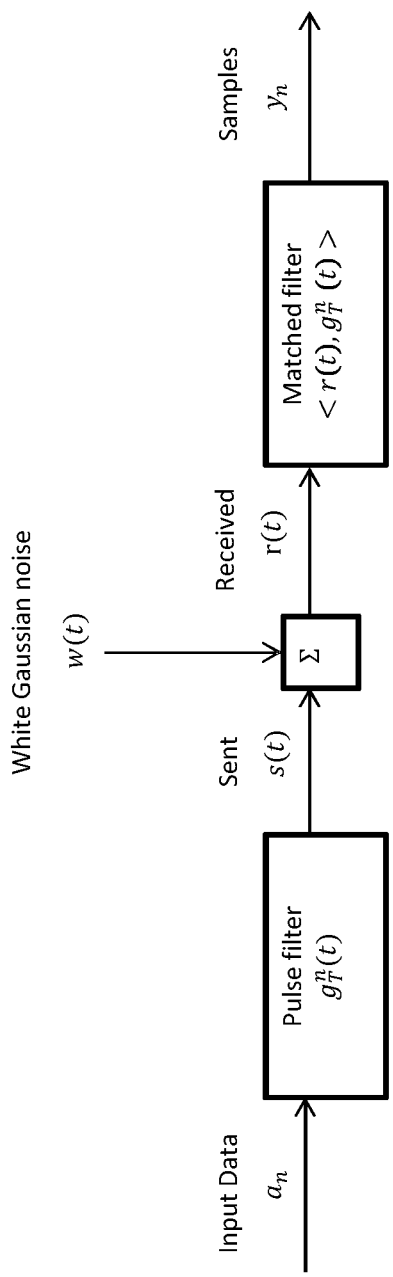
FIG. 2, showing a model with an added white noise function.

Given the samples y, the data symbols a should be estimated with as low probability of error as possible. A block diagram showing this system can be found in FIG. 2.

It turns out that the samples relate to the data (represented by a) and the noise as given by $$y=Ga+G^{1/2}w \quad \text{(Eq. 5)},$$

wherein w is IID (independently and identically distributed) Gaussian noise, and G is a matrix whose elements are given by $$G_{m,n}=\int_{-\infty}^{\infty}\sqrt{\rho}g_T(t-n\rho T)\cdot\sqrt{\rho}g_T(t-m\rho T)dt \quad \text{(Eq. 6)}.$$

A GTMH-precoding scheme is described in the following.

The GTMH-precoding (G-to-minus-half) is based on the above formulation to make a precoding that exploits the described structure, rather than regarding it as noise.

Instead of using the communicated bits a∈A as the amplitudes for PAM (Pulse-Amplitude Modulation) signaling (transmitting based on the filtering), one uses the precoded bits according to $$\hat{a}=G^{-1/2}a \quad \text{(Eq. 7)}$$

as amplitudes. Then the previous system can be diagonalized according to $$\hat{y}=G^{-1/2}y=a+w \quad \text{(Eq. 8)}.$$

The receiver consequently has to solve $$G^{1/2}\hat{y}=y \quad \text{(Eq. 9)}.$$

Figure 3:
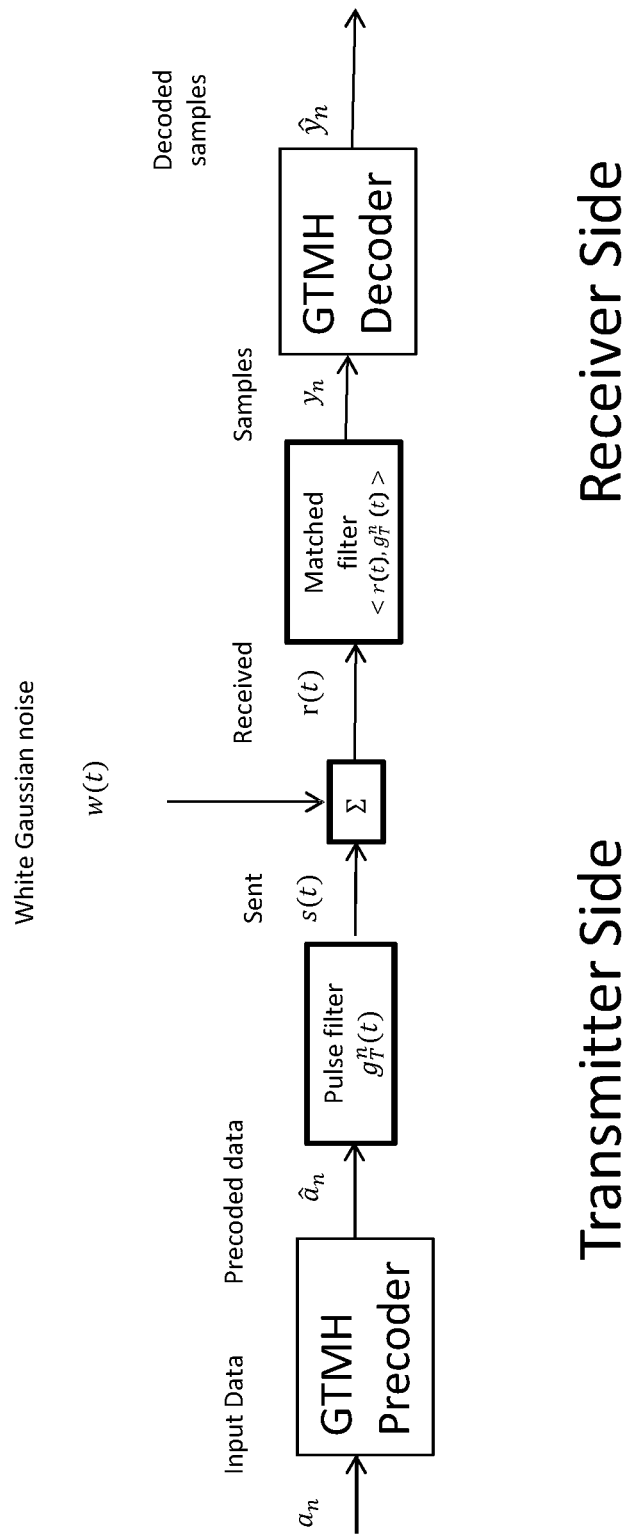
FIG. 3, showing a system with precoding and corresponding decoding.

An ML (Maximum Likelihood) estimation or other estimate can then be applied to ŷ, which may, e.g., be performed using any previously applied estimation algorithm for the ISI-free (InterSymbol Interference-free) case. A receiving node may comprise a corresponding estimator. The model including GTMH-precoding is shown in FIG. 3.

FMBC pulses tend to be longer (in time) than OFDM pulses. To comply with prescribed time intervals for transmission (e.g., by a standard), it is suggested to introduce FTN for FMBC transmission. For machine-type-communication, for instance, (burst) signaling with a duration corresponding to about 12 OFDM symbols may be considered. The length of an FBMC pulse is about 4 times that of an OFDM pulse (that is, the burst would need a duration of about 3 OFDM symbols longer). Therefore, a delay is introduced by the FBMC pulse of 3 OFDM symbols. A delay corresponding to 3 symbols for a burst of 12 symbols implies 25% increased latency for a burst transmission, which could be too large in time-critical MTC.

To manage the delay caused from the length of the FBMC pulse, we use precoded messages and FTN to transmit pulses at rates higher than the Nyquist rate. For burst transmissions consisting of 12 symbols, FBMC takes the time of 15 OFDM symbols (because of the additional 3 symbols needed for the filter in the time-domain). To reduce the time to that of 12 OFDM symbols, we need to reduce the transmission time with a factor of 12/15=0.8. It means that the transmission time needs to be reduced to 80% of the original non-FTN transmission. This is achieved by setting ρ=0.8, which gives 12 FBMC symbols during the same time period of that of 12 OFDM symbols.

The advantage of the solution is to send burst transmissions based on general purpose prototype filters other than OFDM pulses, without trading the latency. This is achieved by using FTN in combination with FBMC.

Generally, it is suggested applying FTN to FBMC. Let the symbols to be transmitted (data symbols, and/or pre-processed symbols) be given by $$a_k=(a_k[0], \ldots, a_k[N-1])$$ (Eq. 10), for k=0, ..., K−1 Precoding may be performed and/or the transmitting node may be adapted to perform precoding on these symbols, in particular GTMH precoding). Precoded symbols are given by $$\hat{a}_k=G^{-1/2}a_k$$ (Eq. 11).

The transmitted signal is determined or given by $$s(t) = \sum_{n=0}^{N-1}\sum_{k=0}^{K-1} \hat{a}_k[n]g\left(t - \frac{n\rho T}{2}\right)e^{j2\pi k F t},$$ (Eq. 12)

wherein ρT is the new pulse spacing (also referred to as separation interval).

On the receiver side, the FBMC receiver decodes $a_k$ based on the matched filter signal $y_k=G\hat{a}_k+G^{1/2}w_k$ by first calculating $$\hat{y}_k=G^{-1/2}y_k=a_k+w_k$$ (Eq. 13), and then finding the maximum likelihood estimate of $a_k$ based on $\hat{y}_k$. An estimator may be utilized therefor.

Figure 4:
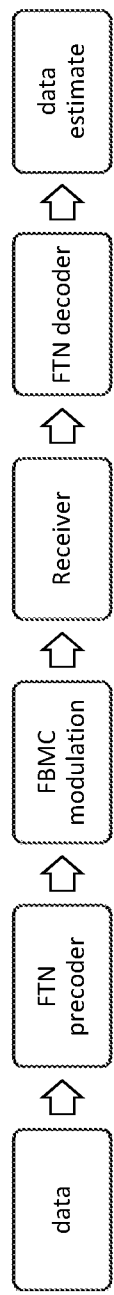
FIG. 4, showing a flow diagram of a method described herein.

FIG. 4 shows an exemplary flow of data through transmitter and receiver. Data in form of data symbols on the transmitter side is provided to a precoder, in particular a FTN precoder, which may perform precoding based on FTN and GTMH as described herein. The resulting precoded data (precoded symbols) are provided to a filter, which in this example is a FBMC filter. The filtering may generally also be seen as and/or comprise modulating the symbols for transmission. The filtered/modulated data is transmitted to a receiver. In the receiver, it is provided to a FTN decoder, which uses a matched filter and the above-described approach for processing (decoding) the received data. In particular, decoding may be based on an added white noise function. An estimator provides a data estimate (representing data symbols having the highest likelihood of representing the data symbols as transmitted).

Figure 5:
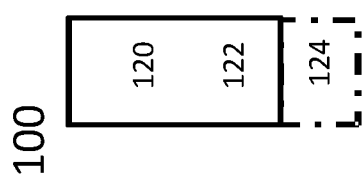
FIG. 5, showing an example of a transmitting node.

FIG. 5 schematically show an example of a transmitting node 100, which in particular may be a base station. Transmitting node 100 comprises control circuitry 120, which may comprise a controller connected to a memory. The control circuitry 120 is operably connected to control radio circuitry 122 of the network node 100, which provides receiver and transmitter and/or transceiver functionality. An antenna circuitry 124 may be connected or connectable to radio circuitry 122 for signal reception or transmittance and/or amplification. The transmitting node 100 may be adapted to carry out any of the methods for operating a transmitting node disclosed herein; in particular, it may comprise corresponding circuitry, e.g. control circuitry.

Figure 6:
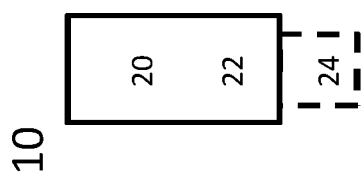
FIG. 6, showing an example of a receiving node.

FIG. 6 schematically shows a receiving node 10, which may in particular be implemented as a terminal. Receiving node 10 comprises control circuitry 20, which may comprise a controller connected to a memory. Receiving node 10 also comprises radio circuitry 22 providing receiving and transmitting or transceiving functionality, the radio circuitry 22 connected or connectable to the control circuitry. An antenna circuitry 24 of the receiving node 10 is connected or connectable to the radio circuitry 22 to collect or send and/or amplify signals. Radio circuitry 22 and the control circuitry 20 controlling it are configured for cellular communication with a network, in particular a base station. The receiving node 10 may be adapted to carry out any of the methods for operating a receiving node disclosed herein; in particular, it may comprise corresponding circuitry, e.g. control circuitry.

FIG. 7 shows an exemplary method for operating a transmitting node, which may be any of the transmitting nodes described herein. The method comprises an action TS10 of transmitting a signal based on Filter Bank Multi-Carrier, FBMC, filtering, wherein the signal comprises signal carrying pulses, g(t), the pulses having a sampling interval T, the pulses being transmitted with a separation interval of ρT, with 0<ρ<1.

Figure 8:
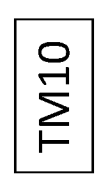

FIG. 8 shows an example of a transmitting node. The transmitting node may comprise a transmitting module TM10 for performing action TS10.

FIG. 9 shows an exemplary method for operating a receiving node, which may be any of the receiving nodes described herein. The method comprises an action RS10 of decoding a received signal based on Filter Bank Multi-Carrier, FMBC, filtering, wherein the signal comprises signal carrying pulses, g(t), with a sampling interval T, and decoding is performed utilizing a separation interval of ρT, with 0<ρ<1.

FIG. 10 shows an example of a receiving node. The receiving node may comprise a receiving module RM10 for performing action RS10.

Downlink (DL) generally refers to transmission of data to a node/into a direction further away from core network (physically and/or logically); in particular from a base station or to a terminal, often uses specified spectrum/bandwidth different from uplink (e.g. in LTE).

Uplink (UL) generally refers to transmission of data to a node/into a direction closer to a network core (physically and/or logically); in particular from terminal to a base station or eNodeB.

A terminal may be implemented as user equipment, and/or as a device adapted for MTC, e.g. a sensor or machine. The terminal may be mobile, or in some cases stationary (e.g., when implemented in a machine). Examples of user equipment are mobile phone, smartphone, laptop, desktop computer, tablet, etc.

n this description, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a transmitting node in a wireless communication network, the method comprising transmitting a signal based on Filter Bank Multi-Carrier, FBMC, filtering, the signal comprising signal carrying pulses, g(t), the pulses having a sampling interval T, the pulses being transmitted with a separation interval of $\rho T$, with $0<\rho<1$, wherein the transmitting is based on precoding utilizing a G-to-minus-half (GTMH) precoder.

2. The method according to claim 1, wherein the transmitting is based on FBMC filtering being performed on precoded symbols.

3. The method according to claim 1, wherein the transmitting is based on FBMC filtering being performed on precoded symbols.

4. A transmitting node for a wireless communication network, the transmitting node comprising a control circuitry further comprising a controller connected to a memory, the control circuitry operably connected to a control radio circuitry providing functionality of a receiver and a transmitter or a transceiver to the transmitting node, the transmitting node being configured to transmit a signal based on Filter Bank Multi-Carrier, FBMC, filtering, the signal comprising signal carrying pulses, g(t), with a sampling interval T, the pulses being transmitted with a separation interval of $\rho T$, with $0<\rho<1$, wherein the transmitting is based on precoding utilizing a G-to-minus-half (GTMH) precoder.

5. The transmitting node according to claim 4, wherein the transmitting is based on FBMC filtering being performed on precoded symbols.

6. The transmitting node according to claim 4, wherein the transmitting is based on FBMC filtering being performed on precoded symbols.

7. A method for operating a receiving node in a wireless communication network, the method comprising:
decoding a received signal based on Filter Bank Multi-Carrier, FMBC, filtering, the signal comprising signal carrying pulses, g(t), with a sampling interval T, and decoding is performed utilizing a separation interval of $\rho T$, with $0<\rho<1$, wherein the decoding utilizes a G-to-minus-half (GTMH) decoder.

8. The method according to claim 7, wherein the decoding comprises determining a maximum likelihood estimate of data symbols based on an added white noise function.

9. The method according to claim 7, wherein the decoding comprises determining a maximum likelihood estimate of data symbols based on an added white noise function.

10. A receiving node for a wireless communication network, the receiving node comprising a control circuitry further comprising a controller connected to a memory, the control circuitry connectable to a radio circuitry providing functionality of a receiver, transmitter or transceiver to the receiving node, the receiving node being configured to decode a received signal based on Filter Bank Multi-Carrier, FMBC, filtering, the signal comprising signal carrying pulses, g(t), with a sampling interval T, and decoding is performed utilizing a separation interval of $\rho T$, with $0<\rho<1$, wherein the decoding utilizes a G-to-minus-half (GTMH) decoder.

11. The receiving node according to claim 10, wherein the decoding comprises determining a maximum likelihood estimate of data symbols based on an added white noise function.

12. The receiving node according to claim 10, wherein the decoding comprises determining a maximum likelihood estimate of data symbols based on an added white noise function.

13. A non-transitory computer storage medium storing a computer program having instructions, the instruction causing control circuitry to at least one of control and perform a method when executed by the control circuitry, the method comprising: decoding a received signal based on Filter Bank Multi-Carrier, FMBC, filtering, the signal comprising signal carrying pulses, g(t), with a sampling interval T, and decoding is performed utilizing a separation interval of $\rho T$, with $0<\rho<1$, wherein the decoding utilizes a G-terminus-halt (GTMH) decoder.

* * * * *